METHOD OF PREPARING MAGNETIC ACICULAR GAMMA IRON OXIDE
Filed Jan. 11, 1962
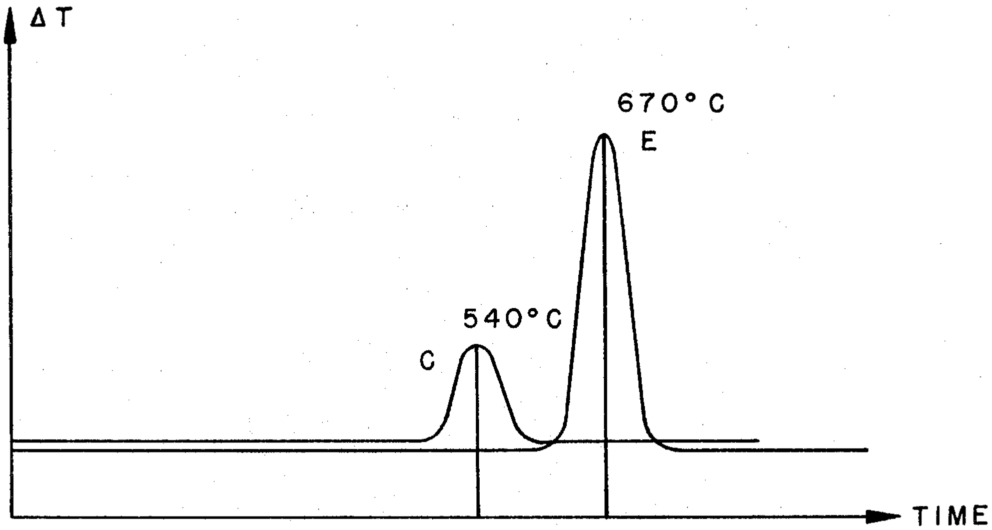
INVENTOR.
CHARLES MAHO
BY
John C. LaPrade
ATTORNEY

United States Patent Office 3,272,595

Patented Sept. 13, 1966

3,272,595

METHOD OF PREPARING MAGNETIC ACICULAR GAMMA IRON OXIDE

Charles Maho, Mechelse Steenweg 119, Hove-Antwerp, Belgium

Filed Jan. 11, 1962, Ser. No. 165,610
Claims priority, application Netherlands, Jan. 13, 1961, 260,059
7 Claims. (Cl. 23—200)

The present invention relates to the manufacture of magnetic recording material, more particularly it relates to the preparation of thermally stabilised magnetic acicular $\gamma$-$Fe_2O_3$ which is used in the recording layer.

As already known the usual magnetic recording materials consist of a ferromagnetic layer applied to a support. The ferromagnetic recording layer usually consists of a ferromagnetic powder, which has been homogenously divided in a binding agent.

The support is usually manufactured from cellulose triacetate, polyvinyl chloride or polyethylene terephthalate, the latter being either or not symmetrically or asymmetrically stretched.

The ferromagnetic recording layer is applied to a support starting from a dispersion of a ferromagnetic powder, most often $\gamma$-$Fe_2O_3$, into a solution of a binding agent, such as polyvinyl acetate, copolymers of vinylchloride and vinylacetate, cellulose esters, after-chlorinated polyvinyl chloride, copolymers of butadiene and acrylonitrile or self-hardening polymers.

The ferromagnetic dispersion is e.g. according to the knife coating process, roller coating process or the graving offset process applied to the support. These coating techniques are described in "Verein Deutscher Ingenieure" 100, No. 13, p. 545–548.

The ferromagnetic layer is dried and sometimes calendered after coating.

Concerning the composition of the magnetic dispersion layer, as well as the usual supports and the manufacture of the magnetic recording material in general, may be referred to H. G. M. Spratt, "Magnetic Tape Recording," Heywood & Company Ltd., 1958, London, p. 113–139.

As known the recording properties of the recording layer are principally determined by the quality of the magnetic powder. In cases of high coercivity and low permeability an anisotropic magnetic powder is preferably used such as e.g. acicular $\gamma$-$Fe_2O_3$ (see Spratt, "Magnetic Tape Recording," p. 36). Consequently the preparation of acicular $\gamma$-$Fe_2O_3$ is aimed at.

From the U.S. patent specification 2,694,656 a process is known for the preparation of a ferromagnetic iron oxide powder which principally consists of acicular $\gamma$-$Fe_2O_3$ crystals with a length of 0.5 to 2$\mu$, with a cubic crystal lattice structure and having a coercivity of 200 to 500 Oerstedt and even higher.

In a first reaction (nuclei-forming process) a ferrous salt is precipitated by means of lye and oxidized to colloidal $Fe_2O_3 \cdot H_2O$ by passing an air current through it.

In a second reaction (growing process) an amount of ferrous salt in aqueous medium is oxidized, together with the $Fe_2O_3 \cdot H_2O$ nuclei of the first reaction, by means of aerial oxidation in the presence of iron at a temperature of 40 to 80° C. The nuclei are growing at the expense of the metallic iron to acicular $Fe_2O_3 \cdot H_2O$.

The formed $Fe_2O_3 \cdot H_2O$ is then dehydrated by heating and then reduced to $Fe_3O_4$ from which by oxidation the magnetic acicular $\gamma$-$Fe_2O_3$ is formed whilst heating.

This process and especially the oxidation, whilst heating, of the $Fe_3O_4$ must be carried out very carefully in view of the obtaining of an iron oxide with good magnetic properties. During the oxidation one has to pay special attention, that no local overheating in the powder mass occurs, because hereby the magnetic $\gamma$-$Fe_2O_3$, which is only thermally stabile in a limited way, is converted into the paramagnetic hematite ($\alpha$-$Fe_2O_3$).

It is obvious that in a process according to which magnetic acicular $\gamma$-$Fe_2O_3$ is prepared with a higher thermal stability against the conversion into the paramagnetic hematite, the oxidation step of the $Fe_3O_4$ faster occurs, with greater reproductibility and with a higher yield of $\gamma$-$Fe_2O_3$.

It is an object of this invention to prepare magnetic acicular $\gamma$-$Fe_2O_3$ with improved thermal stability.

It is a further object of this invention to manufacture a magnetic recording material containing a magnetic acicular $\gamma$-$Fe_2O_3$ which posses an increased thermal stability.

It has now been found that by the application of the classical method of preparation, magnetic acicular $\gamma$-$Fe_2O_3$ with much better thermal stability can be obtained if the nuclei forming and/or growing process takes place in the presence of a compound of a metal selected from the group consisting of molybdenum and tungsten, e.g., a molybdate, a tungstate or mixtures thereof.

The magnetic properties and the composition of the magnetic iron oxide prepared according to the classical method described in U.S. patent specification 2,694,656 and magnetic iron oxide prepared according to the present invention are compared with each other in the following table. The results under A, B and C relate to the classical method for the preparation of acicular $\gamma$-$Fe_2O_3$ and the results mentioned under D and E relate to a thermally stabilised acicular $\gamma$-$Fe_2O_3$.

The oxidation of the $Fe_3O_4$ was carried out at an average temperature of 300 to 400° C.

By number of cycles is meant, the number of times the same iron scrap is used in the growing process. In using repeatingly the same iron scrap, there appears to be a sharp decline in the thermal stability and an intense decrease of the remanence. As iron scrap mild steel was used.

| | Number of Cycles | Coercivity in Oerstedt | Remanence In Gauss | Percent Mo | Percent $\alpha$-$Fe_2O_3$ |
|---|---|---|---|---|---|
| A | 1 | 322 | 2.040 | 0 | 1.2 |
| B | 4 | 290 | 1.700 | 0 | 1.2 |
| C | 20 | 240 | 1.500 | 0 | 2.3 |
| D | 1 | 348 | 2.080 | 1 | 0.5 |
| E | 20 | 290 | 2.060 | 1 | 0.8 |

From this table it results that it is quite difficult to obtain reproducible results according to the classical method and that the content of $\alpha$-$Fe_2O_3$ is higher than obtained with thermally stabilised acicular $\gamma$-$Fe_2O_3$ obtained according to the present invention.

The content of the molybdenum and/or tungsten in the finally obtained $\gamma$-$Fe_2O_3$ amounts to 0.1 to 3%.

The increased thermal stability has consequently the advantage that the temperature for the oxidation of the $Fe_3O_4$ can be considerably increased without the formation in the formed ferri-oxide product of an important amount of paramagnetic $Fe_2O_3$. Owing to this increased temperature, the time for the oxidative process can be much shortened.

The increased thermal stability particularly appears from the differential thermal analysis curves (see drawing), made of the iron oxide mentioned under C and E in the above-mentioned table. As neutral body for the measurement barium carbonate has been used. The differential temperature curves show the difference in increase of the temperature of the sample and of the neutral body on the y-axis ($\Delta T$) and the course of the time on the x-axis ($t$).

The temperature measured at the maximum of $\Delta T$ is indicated for each curve. It results therefrom that the sample mentioned under E possesses an increased thermal stability. The explanation for this rapid increase of $\Delta T$ is to be referred to the fact, that during the conversion of magnetic $\gamma$-$Fe_2O_3$ in paramagnetic $\alpha$-$Fe_2O_3$ a number of calories is set free. This is done, as is stated in comparing of the curves C and E, much faster for the sample C, which means on a lower temperature than for sample E.

The following are preparations of thermally stabilized acicular $\gamma$-$Fe_2O_3$.

PREPARATION 1

1.2 kg. of crystalline ferrous sulfate are dissolved in 0.6 l. of water at room temperature and precipitated with a solution of 0.2 kg. of sodium hydroxide in 1 l. of water. The precipitated ferrous hydroxide is oxidised for 10 hr. by means of air blown through the mixture until the colloidal suspension shows a yellow color. This suspension containing nuclei of $Fe_2O_3 \cdot H_2O$ together with one kg. of iron scrap and 2.5 g. of sodium molybdate are added to 10 l. of 5% aqueous ferrous sulfate. Through this reaction mixture, a finely divided air current of 80° C. is blown through the mixture for 12 hr. at a rate of 30 l. per minute. The formed $Fe_2O_3 \cdot H_2O$ is washed and dried by atomization. Reduction by means of hydrogen between 350 and 450° C. for 30 minutes and subsequent oxidation by air between 300 and 400° C. yield a brown magnetic iron oxide having the following properties:

$H_c$=328 Oerstedt
$B_r$=2.040 gauss
Percent of $\alpha$-$Fe_2O_3$=1.3
Percent of Mo=0.7

PREPARATION 2

$Fe_2O_3 \cdot H_2O$ nuclei are prepared as described in Preparation 1, but by means of a first aqueous ferrous sulfate solution containing 3 g. of sodium tungstate. After the growing stage and the further processing as described in Preparation 1, a brown magnetic iron oxide is obtained having the following properties:

$H_c$=341 Oerstedt
$B_r$=2.060 gauss
Percent of $\alpha$-$Fe_2O_3$=0.6
Percent of W=1.2.

The following example illustrates the application of the acicular $\gamma$-$Fe_2O_3$ in a magnetic recording layer.

*Example*

The following composition is ground for 20 hrs. in a ball-mill:

| | | |
|---|---|---|
| $\gamma$-$Fe_2O_3$ of Preparation 1 | kg. | 100 |
| 1,2-dichloroethane | l. | 130 |
| Methanol | l. | 20 |
| Polyvinylbutyral (marketed by Wacker Chemie G.m.b.H., Munich, Germany, under the trade name Pioloform BS (8% of free hydroxyl groups)) | kg. | 4 |

To this mixture the following composition is added:

| | | |
|---|---|---|
| Pioloform BS (trade name) | kg. | 17.2 |
| Methanol | l. | 51 |
| 1,2-dichloroethane | l. | 71 |

After grinding for 48 hr. the obtained dispersion is filtered and applied onto a carrier of polyethylene terephthalate according to the roller coating system described in Verein Deutscher Ingenieure vol. 100, No. 13, p. 545–548.

I claim:

1. A method for preparing magnetic acicular $\gamma$-$Fe_2O_3$ with improved thermal stability from $Fe_3O_4$ comprising the steps of (a) precipitating an iron (II) salt from an aqueous solution by means of a strong base, said precipitation being carried out in the presence of a compound of a metal selected from the group consisting of molybdenum, and tungsten;

(b) oxidizing the acicular iron (II) hydroxide formed in step a to acicular $Fe_2O_3 \cdot H_2O$ nuclei by blowing air through the suspension obtained in step (a);

(c) adding the suspension obtained step (b) to a solution of an iron (II) salt and treating this composition with air in the presence of iron metal, to enable the $Fe_2O_3 \cdot H_2O$ nuclei to grow;

(d) separating and drying the acicular $Fe_2O_3 \cdot H_2O$ particles obtained in step (c);

(e) dehydrating the acicular $Fe_2O_3 \cdot H_2O$ whilst heating and reducing it between 300 and 450° C. to acicular $Fe_3O_4$; and (f) oxidizing at 300–400° C. the $Fe_3O_4$ to magnetic acicular $\gamma$-$Fe_2O_3$ by means of a gas containing free oxygen.

2. A method for preparing magnetic acicular $\gamma$-$Fe_2O_3$ with improved thermal stability from $Fe_3O_4$ comprising the steps of (a) precipitating an iron (II) salt from an aqueous solution by means of a strong base;

(b) oxidizing the acicular iron (II) hydroxide formed in step (a) to acicular $Fe_2O_3 \cdot H_2O$ nuclei by blowing air through the suspension obtained in step (a), said oxidation being carried out in the presence of a compound of a metal selected from the group consisting of molybdenum, and tungsten;

(c) adding the suspension obtained in step (b) to a solution of an iron (II) salt and treating this composition with air in the presence of iron metal, to enable the $Fe_2O_3 \cdot H_2O$ nuclei to grow;

(d) separating and drying the acicular $Fe_2O_3 \cdot H_2O$ particles obtained in step (c);

(e) dehydrating the acicular $Fe_2O_3 \cdot H_2O$ whilst heating and reducing it between 300 and 450° C. to acicular $Fe_3O_4$; and (f) oxidizing at 300–400° C. the $Fe_3O_4$ to magnetic acicular $\gamma$-$Fe_2O_3$ by means of a gas containing free oxygen.

3. A method for preparing magnetic acicular $\gamma$-$Fe_2O_3$ with improved thermal stability from $Fe_3O_4$ comprising the steps of (a) precipitating an iron (II) salt from an aqueous solution by means of a strong base;

(b) oxidizing the acicular iron (II) hydroxide formed in step (a) to acicular $Fe_2O_3 \cdot H_2O$ nuclei by blowing air through the suspension obtained in step (a);

(c) adding the suspension obtained in step (b) to a solution of an iron (II) salt and treating this composition with air in the presence of iron metal and a compound of a metal selected from the group consisting of molybdenum and tungsten, to enable the $Fe_2O_3 \cdot H_2O$ nuclei to grow;

(d) separating and drying the acicular $Fe_2O_3 \cdot H_2O$ particles obtained in step (c);

(e) dehydrating the acicular $Fe_2O_3 \cdot H_2O$ whilst heating and reducing it between 300 and 450° C. to acicular $Fe_3O_4$; and (f) oxidizing at 300–400° C. the $Fe_3O_4$ to magnetic acicular $\gamma$-$Fe_2O_3$ by means of a gas containing free oxygen.

4. Method for preparing magnetic acicular $\gamma$-$Fe_2O_3$ according to claim 1, wherein a molybdenum compound is added to such an amount that the magnetic acicular $\gamma$-$Fe_2O_3$ contains from 0.1 to 3% by weight of molybdenum.

5. Method for preparing magnetic acicular $\gamma$-$Fe_2O_3$ according to claim 2, wherein a molybdenum compound is added to such an amount that the magnetic acicular $\gamma$-$Fe_2O_3$ contains from 0.1 to 3% by weight of molybdenum.

6. Method for preparing magnetic acicular $\gamma$-$Fe_2O_3$ according to claim 3, wherein a molybdenum compound is added to such an amount that the magnetic acicular $\gamma$-$Fe_2O_3$ contains from 0.1 to 3% by weight of molybdenum.

7. Method for preparing magnetic acicular $\gamma$-$Fe_2O_3$ according to claim 3, wherein a molybdate is added.

References Cited by the Examiner

UNITED STATES PATENTS

| | | |
|---|---|---|
| 2,694,656 | 11/1954 | Camaras. |
| 2,941,901 | 6/1960 | Prill et al. |
| 2,978,414 | 4/1961 | Harz et al. |
| 3,015,628 | 1/1962 | Ayers et al. |
| 3,075,919 | 1/1963 | Gruber et al. |

BENJAMIN HENKIN, *Primary Examiner.*

MURRAY KATZ, MAURICE A. BRINDISI, *Examiners.*

H. E. COLE, E. C. THOMAS, *Assistant Examiners.*